(12) United States Patent
Gerber

(10) Patent No.: US 6,908,085 B2
(45) Date of Patent: Jun. 21, 2005

(54) ROTATING TOOL CHUCKING DEVICE

(75) Inventor: Ernst Gerber, Reigoldswil (CH)

(73) Assignee: Rego-Fix AG (CH)

( * ) Notice: Subject to any disclaimer, the term of this patent is extended or adjusted under 35 U.S.C. 154(b) by 173 days.

(21) Appl. No.: 10/238,756

(22) Filed: Sep. 10, 2002

(65) Prior Publication Data
US 2003/0047889 A1 Mar. 13, 2003

(30) Foreign Application Priority Data

Sep. 11, 2001 (CH) .................................... 1675/01
Jun. 6, 2002 (CH) .................................... 0966/02

(51) Int. Cl.⁷ .............................................. B23B 31/20
(52) U.S. Cl. ..................... 279/43.1; 279/46.3; 279/51
(58) Field of Search ................. 279/43.1, 43.2, 279/46.2, 46.3, 51, 52, 53, 58; 409/234

(56) References Cited

U.S. PATENT DOCUMENTS

| | | | | |
|---|---|---|---|---|
| 1,114,653 A | * | 10/1914 | Starin ........................... | 279/52 |
| 2,469,014 A | * | 5/1949 | Stalhandske ................. | 279/49 |
| 2,709,600 A | * | 5/1955 | Lehde .......................... | 279/52 |
| 4,229,130 A | * | 10/1980 | Franklin ..................... | 409/234 |
| 4,387,906 A | * | 6/1983 | Nicolin ...................... | 279/2.07 |
| 4,938,490 A | * | 7/1990 | Bosek .......................... | 279/42 |
| 5,050,896 A | * | 9/1991 | Peterson ..................... | 279/156 |
| 5,593,258 A | * | 1/1997 | Matsumoto et al. ........ | 409/234 |

FOREIGN PATENT DOCUMENTS

DE 1 954 720 2/1967

* cited by examiner

Primary Examiner—Daniel W. Howell
(74) Attorney, Agent, or Firm—Hoffman & Baron, LLP

(57) ABSTRACT

A Chucking device comprising a collet with an external taper and a collet holder with a taper socket for the chucking of a rotating part, wherein the taper socket of the collet holder and the external taper of the collet have a taper angle which is smaller than the self-locking angle, and the collet has a head for applying an axial force for pressing it into the holder and for pulling it out of the holder.

10 Claims, 5 Drawing Sheets

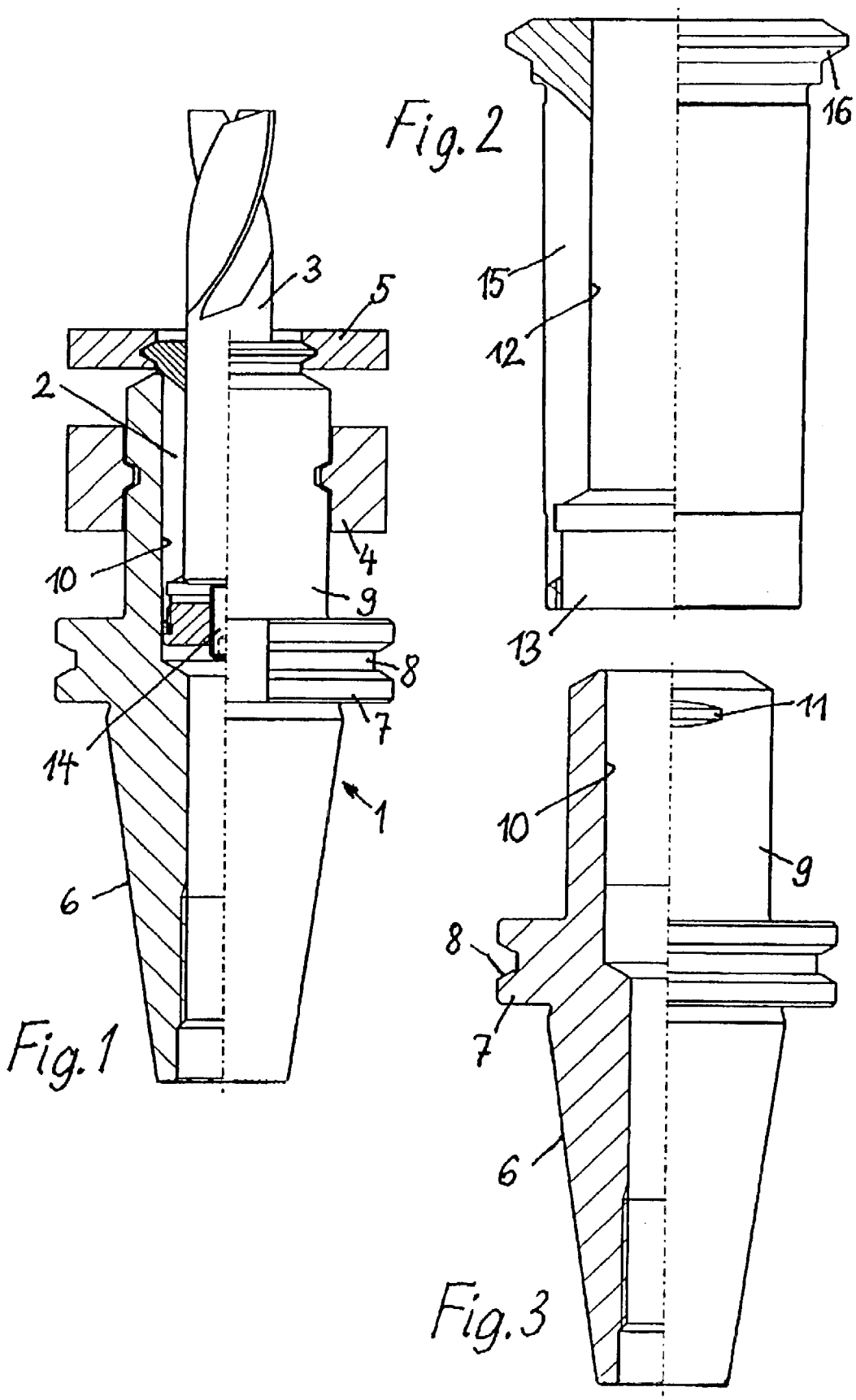

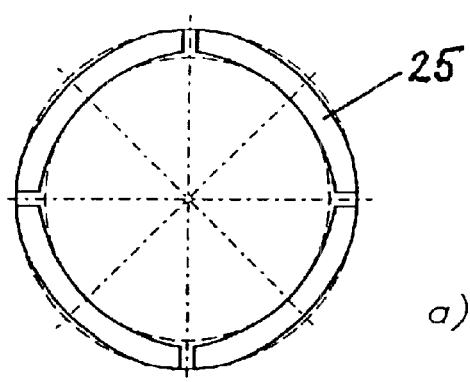
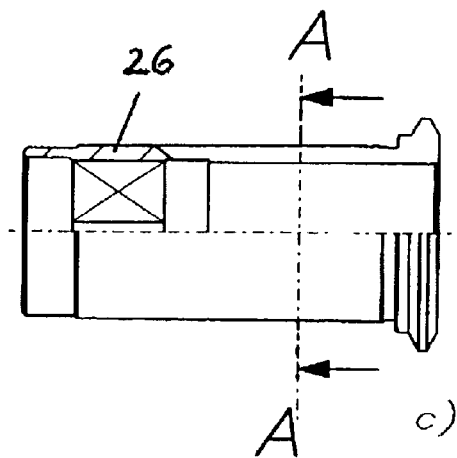
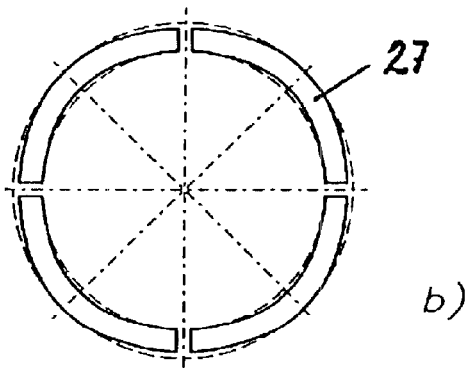
Fig. 6
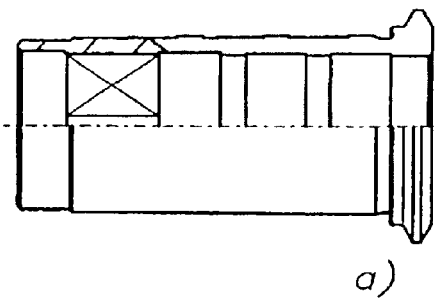
Fig. 7
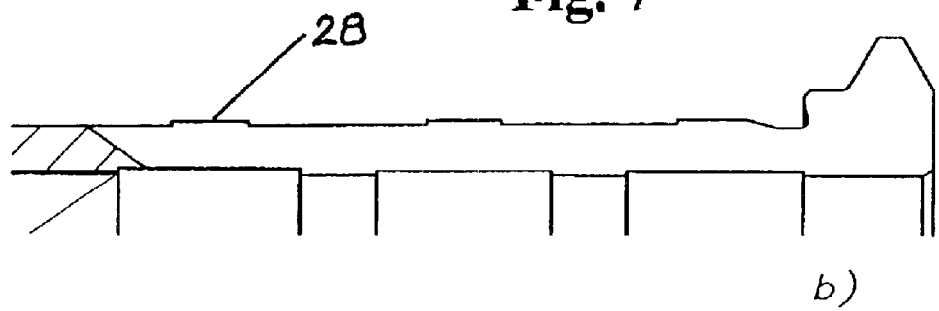

ROTATING TOOL CHUCKING DEVICE

FIELD OF THE INVENTION

The invention relates to a chucking device consisting of a collet with an external taper and a collet holder with a taper socket for the chucking of a rotating part, preferably a tool.

BACKGROUND OF THE INVENTION

Most known chucking devices of this type are based on the principle that a radial pressure is exerted on the tool shank by the interaction of collet holder and collet, by means of which radial pressure the tool is securely held. In a frequently occurring form, the collet holder has an internal taper in which the equiangularly tapered collet is fixed by means of a chucking nut. The collet is slotted, so that it exerts a radial pressure on the inserted tool shank when being pressed into the collet holder (cf., e.g. WO98/32563).

In addition, an important aspect in the case of such chucking devices is the avoidance of unbalance. On the one hand, balancing means are usually provided, but, on the other hand, the possibilities of the occurrence of unbalance should be largely eliminated right from the beginning. This latter requirement leads to the stipulation that a chucking device should consist of as few individual parts as possible and should be geometrically designed as simply as possible. Thus, a chucking device which does not need a chucking nut is proposed in EP-668810. The collet or chucking sleeve is cylindrical and is held hydraulically in the receptacle. Therefore, although this embodiment has one part fewer, namely the chucking nut, the hydraulic arrangement is all the more complicated, so that this does not appear to be the optimum solution.

"Shrink-fit chucks" for thermally shrinking the tool shank in place constitute another solution approach. These certainly meet the requirement for the greatest degree of simplicity in design and the minimum of individual parts, but set against this are other disadvantages, such as, for example, the waiting times for cooling or the risk of burns during handling.

DE-4405242 discloses another form of chucking device which has an external taper on the collet and an internal taper on the receptacle and does not need a chucking nut. In this solution, the concentric-running properties are to be improved by the wall thickness of the receptacle being approximately constant in the axial direction due to a slight degree of taper. At the same time, a small wall thickness of the collet is proposed. Conflicting with this, however, is a very complicated construction of the device for drawing the collet into the taper socket.

SUMMARY OF THE INVENTION

The object of the invention, in the case of a chucking device, is to achieve as far as possible optimum concentric-running properties and simplicity in construction and handling and at the same time to avoid the aforesaid disadvantages of the various known chucking devices.

According to the invention, this is achieved by a chucking device in which the taper socket of the collet holder and the external taper of the collet have a taper angle which is smaller than the self-locking angle, and the collet has a head for applying an axial force for pressing it into the holder and for pulling it out of the holder.

BRIEF DESCRIPTION OF THE DRAWINGS

A preferred exemplary embodiment of the invention is described below with reference to the attached drawings, in which:

FIG. 1 shows a chucking device with inserted tool, partly in section,

FIG. 2 shows the collet separately,

FIG. 3 shows the collet holder separately,

FIGS. 6 to 7 show further embodiments of the collet,

DETAILED DESCRIPTION OF THE PREFERRED EMBODIMENTS

Figure 4:
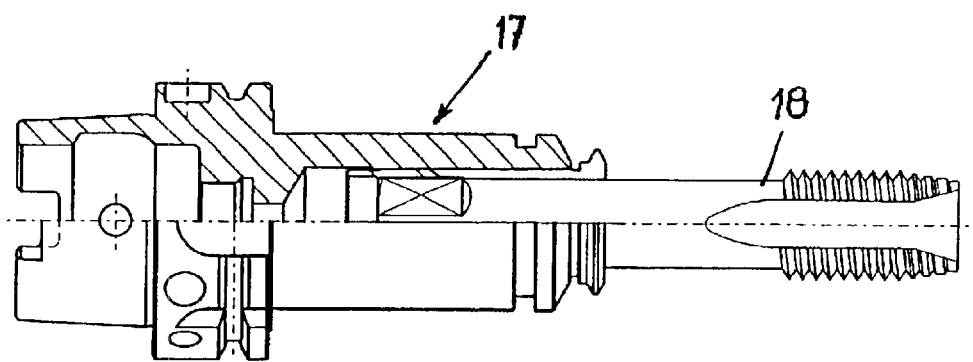
FIG. 4 shows a chucking device with inserted tapping tool.

The chucking device shown in FIG. 1 consists of a collet holder 1 and a collet or chucking sleeve 2 inserted into the collet holder 1 on the tool side. A tool 3, for example a milling cutter in the present case, is inserted in the bore of the collet. Of course, the chucking device is also suitable for other tools, in particular cutting tools. Also indicated schematically are jaws 4, 5 of a press (not shown), with which the collet is pressed into or pulled out of the holder.

In the present exemplary embodiment, the collet holder 1, also shown in FIG. 3, has the known form with a drive-side, i.e. machine-side taper 6, an annular flange 7 with an encircling groove 8, and a tool-side part 9 with cylindrical outer surface.

The tool-side part 9 has a coaxial recess 10 which serves to accommodate the collet. The recess 10 is conically tapered towards the machine side.

In the present description, the opening angle of the taper, i.e. the angle between opposite generating lines of the tapered surface and its axis is designated as taper angle or degree of taper. This taper angle is less than the "self-locking angle" of about 5°, preferably less than 2°.

The outside of the cylindrical part 9 is provided with two tangential grooves 11 or an encircling groove which serve for the engagement of a jaw 4 of the press.

The collet 2, also shown separately in FIG. 2, has a slight conical form over most of its outer surface, this conical form having a degree of taper complementary to the internal taper of the collet holder. At its tool-side end, it is provided with a flange-shaped head 16 which serves for the attachment of a jaw 5 of the press for pressing the collet into position and pulling it out.

A cylindrical bore 12 serves to accommodate the shank of the tool 3. The machine-side end 13 is closed with a threaded spigot 35 and provided with a set screw 14 for adjusting the insertion depth or the projection of the tool. The wall between the head 16 and the machine-side end is provided with a plurality of radially directed slots 15 for increasing the radial elasticity. When the collet 2 with inserted tool 3 is pressed into the tapered recess of the collet holder 1, there is a radial pressure, by means of which the tool is securely held. Since the taper angle is smaller than the self-locking angle, the collet, once it has been pressed in, no longer has to be additionally fastened in the holder.

Since high friction forces occur when the collet is pressed in and pulled out, the external taper of the collet and/or the internal taper of the holder may be provided with a friction-reducing coating in order to avoid seizing. The collet may be made of different materials, e.g. high-strength metal, ceramic (e.g. zirconium ceramic), high-strength plastic.

The principle of the connection of rotating parts, which is shown here taking a chucking device for machine tools as an example, is not restricted to tool carriers but can be used in general for connecting shafts, bolts, spindles, etc.

The device for pressing in and releasing the collet can operate mechanically, electrically, pneumatically or hydraulically.

The chucking device according to the invention is characterized by a number of partly surprising advantages. The retaining force exerted on the tool is higher than in shrink-fit chucks; the chucking device has no chucking mechanism, i.e. no parts which may cause additional unbalance; no locking is necessary on account of the self-locking; the production is simple and cost-effective.

On account of the excellent properties of this chucking device, it is especially suitable as a mounting for tools in which there is a need for high precision with regard to concentric running, balance quality and repetitive accuracy.

Figure 5:
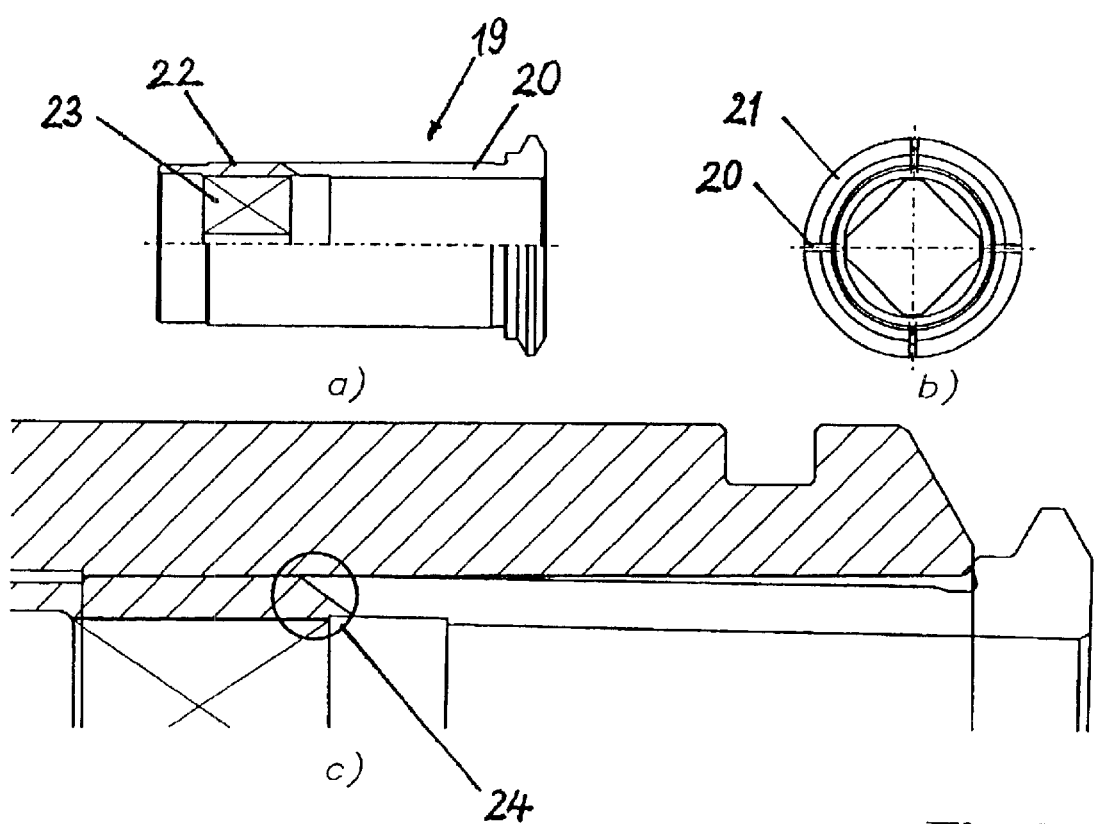
FIG. 5 shows several views of the collet according to FIG. 4.

The chucking device 17 shown in FIG. 4 for a tapping tool 18 is characterized by a number of additional features, of which in particular a square profile for absorbing the high torque occurring during thread cutting can be seen in this representation. The further features can be seen in particular from FIG. 5 and are described below. The chucking sleeve 19, in its tool-side part, is divided by four slots 20 into four quarter-cylinder segments 21 which permit a certain elastic bending in the radial direction. As a result, widening of this region for accepting tool shanks having larger tolerances is possible. In its closed machine-side part 22, an internal square profile 23 is provided for accommodating the square profile of a tool.

When a tool is inserted and the collet is located in the holder, the tool seat is defined in three ways, namely by a friction grip in the part without slots, by a form grip as a result of the square profile and by guidance and by retention of the tool shank in the slotted part. In the transition region between the closed and the slotted part of the collet, this transition region being marked by a circle 24 in FIG. 5c, a type of fulcrum point is produced by the different pressing forces between holder bore and collet.

In the embodiments shown in FIGS. 6a and 6b, the segments separated by slots are additionally shaped in the radial direction. The segments 25 of the embodiment shown in FIG. 6a have a smaller curvature than the part 26 without slots. As a result, the tool shank is first clamped and centred in the centre of the segment. In the embodiment according to FIG. 6b, the curvature of the segments 27 is greater, so that the tool shank is first clamped and centred at the edges of the segments along the slots.

In the embodiment shown in FIG. 7, in each case in an alternating manner on their inner and outer surfaces, the segments separated by slots have one or more flat protrusions 28 encircling in an annular manner, by means of which protrusions 28 a non-linear force distribution and a corresponding spring effect are obtained.

Figure 8:
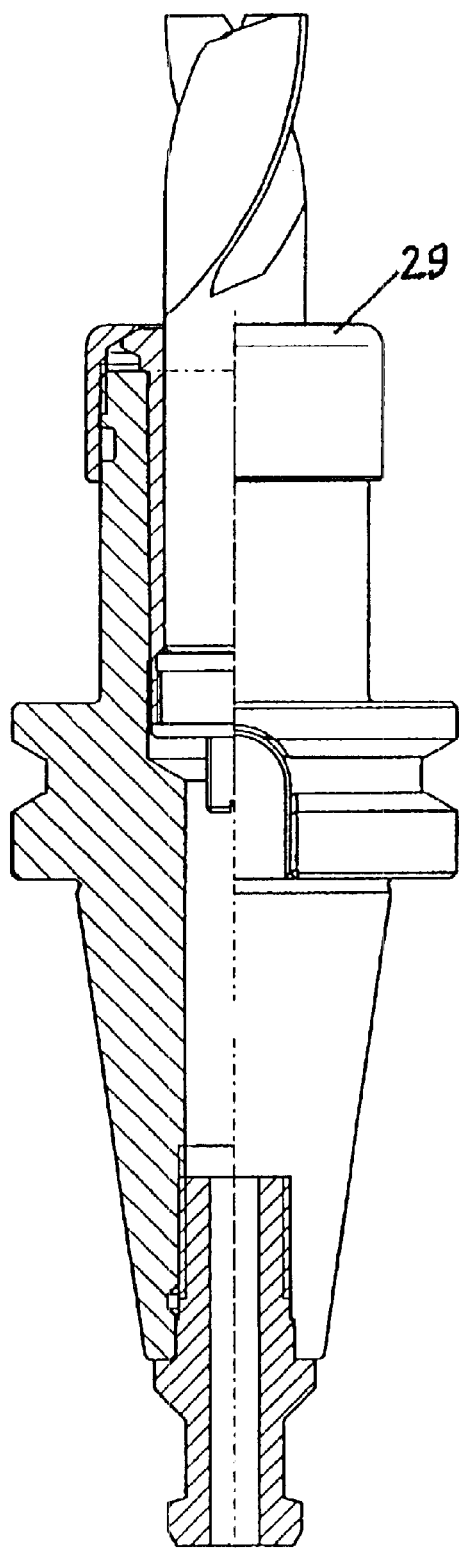
FIGS. 8 to 11 show chucking devices with additional securing of the collet.

As already mentioned, on account of the self locking as a result of the small taper angle, no locking of the collet in the holder is necessary. However, for especially critical operating conditions, e.g. pronounced vibrations, etc., it may be desired to provide a securing means. One possibility for such a securing means is the cap 29 shown in FIG. 8, which is screwed with an internal thread onto a thread arranged externally on the lateral surface of the holder and holds the collet by means of its inwardly directed flange. Since this cap only serves for securing and the known forces of a chucking nut do not have to be absorbed by it, it can be very light, so that it does not constitute a substantial unbalance problem.

Figure 9:
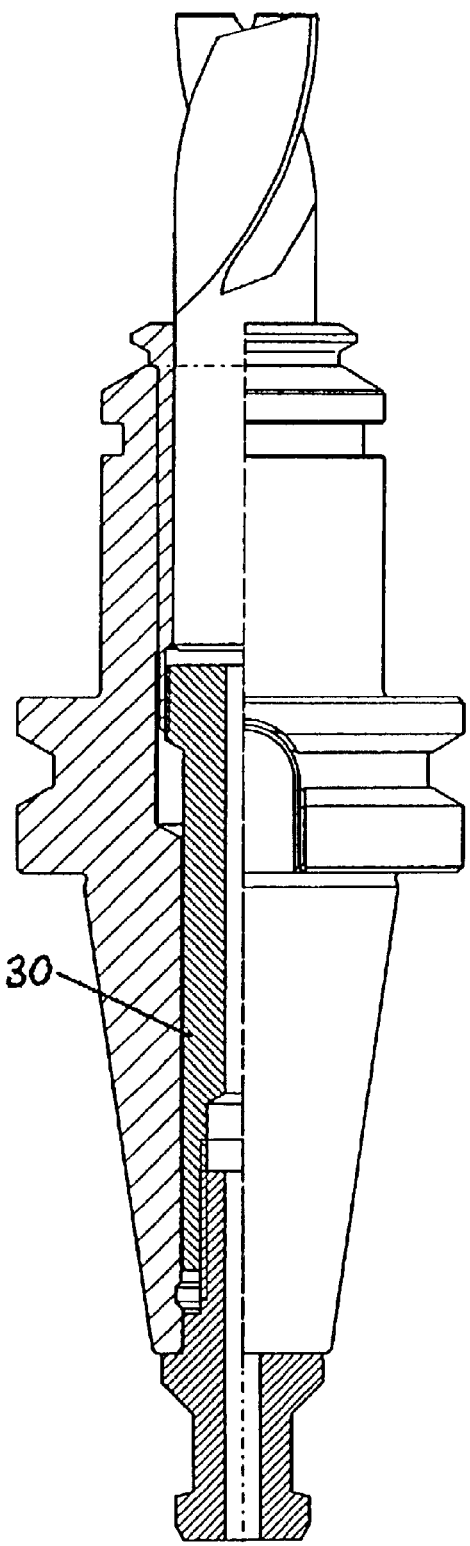
Figure 10:
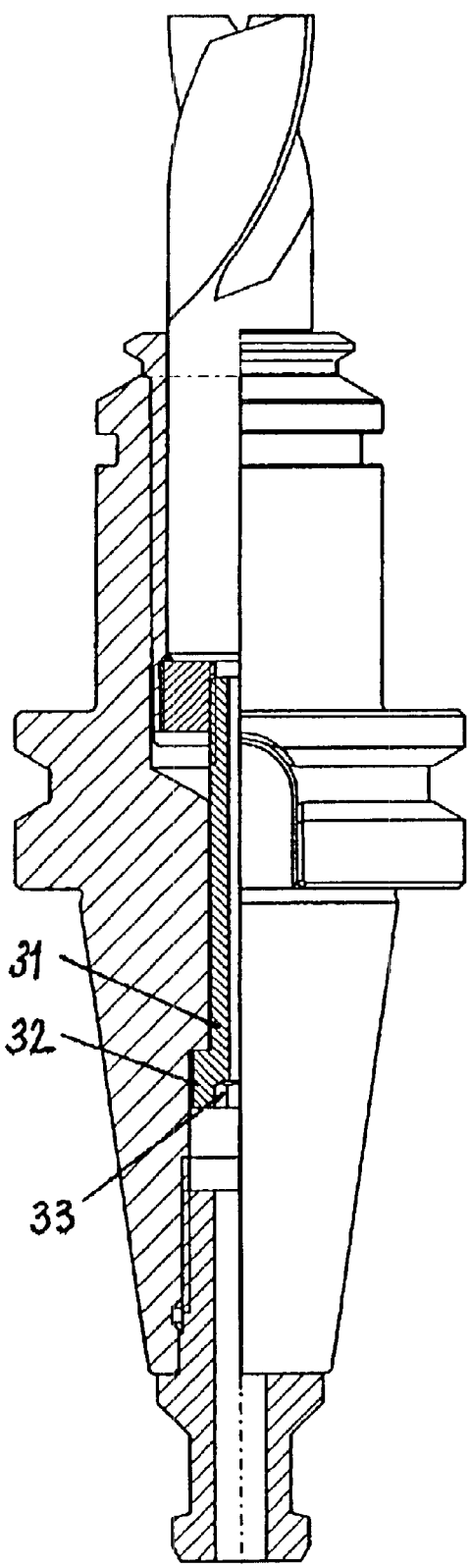
Figure 11:
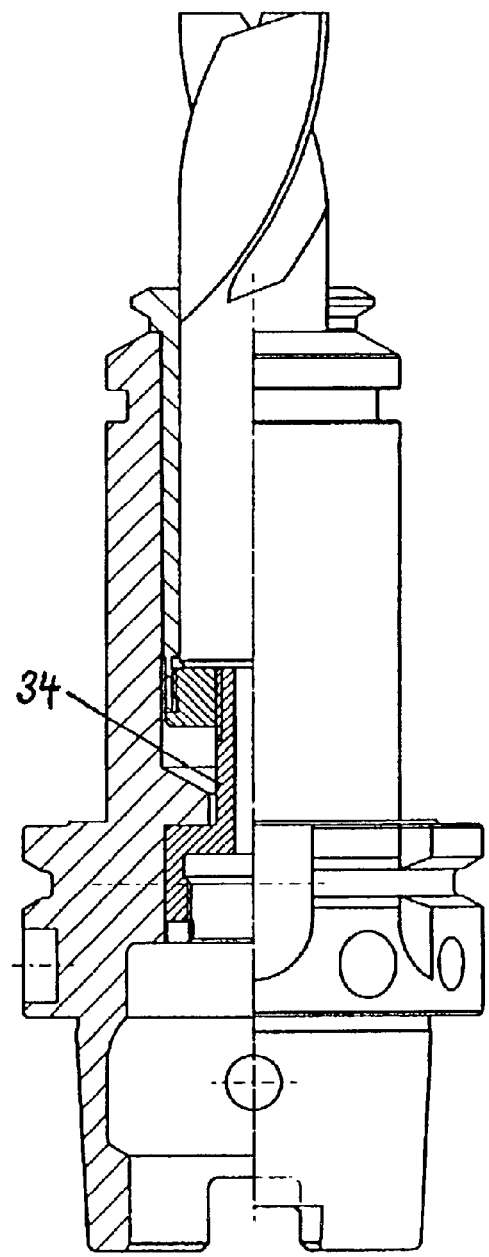

Even more favourable with regard to the avoidance of unbalance is the solution shown in FIG. 9, in which the depth stop for the tool is designed as an elongated sleeve 30 which is held from the rear side of the holder by means of threads. A somewhat different form is shown in FIG. 10. An elongated sleeve 31 can be screwed into the depth stop, and this sleeve 31, on the side remote from the tool, engages behind a step in the holder by means of a widened portion 32. A hexagon socket 33 in the sleeve serves for the fastening screw. A solution similar to the above and having a sleeve 34 which can be screwed into the depth stop for a "hollow shank taper" is shown in FIG. 11.

The collets of the chucking device according to the invention may of course be designed to be metallically sealing. If the slots of the collet are incorporated from the tool side, there is a sealing ring between the closed machine-side part of the collet, the tool shank and the holder. The slots may also be incorporated from the machine side. In this case, there is a sealing ring between the tool-side closed part, the tool shank and the holder. Finally, the slots may also be incorporated alternately from the machines and the tool side. The seal then alternates in the front and the rear part of the collet between it, the tool shank and the holder. Two or more slots are possible.

I claim:

1. Chucking device comprising a collet with an external taper and a collet holder with a taper socket for the chucking of a rotating part, wherein said taper socket of said collet holder and said external taper of the collet have a taper angle which is smaller than the self-locking angle, and the collet has a head for applying an axial force for pressing it into the holder and for pulling it out of the holder, and a plurality of radially directed slots defining segments having a variable radius.

2. Chucking device according to claim 1, wherein said collet has a plurality of radially directed slots.

3. Chucking device according to claim 1, wherein said taper angle is less than 50°.

4. Chucking device according to claim 3, wherein said taper angle is less than 2°.

5. Chucking device according to claim 1, wherein a coaxially arranged stop screw is provided on the drive-side end of said collet.

6. Chucking device according to claim 1 wherein said segments have a curvature which is different from the curvature of a part of the collet without slots.

7. Chucking device according to claim 1, having a plurality of annular protrusions encircling said segments on the outer and inner surfaces.

8. Chucking device according to claim 1, wherein a securing cap is provided on said collet holder.

9. Chucking device according to claim 1, wherein an internal sleeve with securing means is provided in said collet holder.

10. Chucking device according to claim 9, wherein said internal sleeve is movable in the axial direction.

* * * * *